United States Patent [19]

Natsuume et al.

[11] Patent Number: 4,652,435

[45] Date of Patent: Mar. 24, 1987

[54] STABILIZED FERROUS COMPOUND COMPOSITION

[75] Inventors: Tadao Natsuume, Tokyo; Tsunehisa Ueda, Yokohama, both of Japan

[73] Assignee: Nippon Zeon Co., Ltd., Tokyo, Japan

[21] Appl. No.: 807,245

[22] Filed: Dec. 10, 1985

[30] Foreign Application Priority Data

Dec. 13, 1984 [JP] Japan .................................. 59-283482
Dec. 15, 1984 [JP] Japan .................................. 59-264804
Jun. 17, 1985 [JP] Japan .................................. 60-131235

[51] Int. Cl.$^4$ .................... C01G 41/14; A01N 59/16; A61K 33/26; C01B 13/00
[52] U.S. Cl. .................................... 423/265; 423/268; 423/558; 424/147; 252/186.33; 252/407; 252/400.31; 252/400.53
[58] Field of Search ............. 423/265, 268, 558; 252/186.33, 407, 400.31, 400.53; 424/147

[56] References Cited

U.S. PATENT DOCUMENTS

| | | | |
|---|---|---|---|
| 1,922,816 | 8/1933 | McKinney | 252/407 |
| 2,324,348 | 7/1943 | Anderson | 252/407 |
| 2,411,636 | 11/1946 | Preiswerk | 423/265 |
| 2,822,317 | 2/1958 | Gulesich | 424/147 |
| 4,362,710 | 12/1982 | Watanabe | 424/147 |

FOREIGN PATENT DOCUMENTS

| | | | |
|---|---|---|---|
| 55-109210 | 8/1980 | Japan | 423/265 |
| 57-58604 | 4/1982 | Japan | 424/147 |
| 58-56539 | 9/1983 | Japan | 423/265 |
| 58-167425 | 10/1983 | Japan | 423/265 |

*Primary Examiner*—Gary P. Straub
*Attorney, Agent, or Firm*—Sherman and Shalloway

[57] ABSTRACT

A composition comprising a ferrous compound and as a stabilizer, at least one compound selected from the group consisting of (A) erythorbic acid compounds, (B) hydroxycarboxylic acid compounds and (c) oxocarboxylic acid compounds.

15 Claims, No Drawings

STABILIZED FERROUS COMPOUND COMPOSITION

This invention relates to a composition comprising a ferrous compound as a main component, and more specifically, to a novel composition having improved stability comprising a ferrous compound and at least one compound selected from (A) an erythorbic acid compound, (B) a hydroxycarboxylic acid compound and (C) an oxocarboxylic acid compound.

Ferrous compounds such as ferrous sulfate and ferrous chloride are used as raw materials for the production of deodorants, black iron oxide, mordants, sewage treating agents, medicines, leather-making chemicals, red iron oxide, etc. These iron compounds, whether as an aqueous solution or a crystal powder, are susceptible to oxidation by oxygen present in air or water. This leads to the trouble that within short periods of time, they are changed to ferric compounds and colored, or they are precipitated and consumed.

Attempts have been made to overcome this trouble. For example, Japanese Laid-Open Patent Publication No. 156539/1983 discloses the addition of L-ascorbic acid to an aqueous solution of a ferrous compound, and Japanese Laid-Open Patent No. 142856/1985 proposes the powderization of the aqeuous solution obtained by the method of the first-mentioned Japanese patent document by drying. These methods, however, have the defect that the stabilizers used are limited to expensive L-ascorbic acid, and the use of this stabilizer alone produces no sufficient stabilizing effect.

It is an object of this invention to remove these defects of the prior art.

Extensive investigations of the present inventors have now led to the discovery that ferrous compounds can be stabilized for a long period of time even in air by incorporating at least one compound selected from (A) erythorbic acid compounds, (B) hydroxycarboxylic acid compounds and (C) oxocarboxylic acid compounds in the ferrous compounds.

Thus, according to this invention, there is provided an iron compound composition comprising a ferrous compound and as a stabilizer at least one compound selected from the group consisting of (A) erythorbic acid compounds, (B) hydroxycarboxylic acid compounds and (C) oxocarboxylic acid compounds.

Specific examples of the ferrous compounds are ferrous sulfate ($FeSO_4$), ferrous chloride ($FeCl_2$) and ferrous nitrate [$Fe(NO_3)_2$]. Ferrous sulfate is most preferred in view of its cost and availability. When the ferrous compound is used in the form of an aqueous solution, the concentration of the ferrous compound may be selected as desired within a range of concentrations which enable the ferrous compound to dissolve in water.

The erythorbic acid compounds (A) are known as an antioxidant for foods, etc. It has however been found for the first time by the present inventors that the erythorbic acid compounds (A) produce a marked effect as a stabilizer for ferrous compounds which are very susceptible to oxidation The compounds (A) may include both erythorbic acid itself, and its salts such as sodium and potassium salts.

The hydroxycarboxylic acid compounds (B) are hydroxycarboxylic acids containing at least one hydroxyl group and at least one carboxyl group in the molecule, or salts of these acids. Specific examples include aliphatic or aromatic compounds preferably having 2 to 8 carbon atoms, such as lactic acid, hydroxyacetic acid, hydroxybutyric acid, malic acid, tartaric acid, glyceric acid, citric acid, alpha-methylmalic acid, beta-hydroxyglutaric acid, desoxalic acid, monoethyl tartrate, monoethyl citrate, gluconic acid, galactaric acid, glucronic acid, ketogluconic acid, salicylic acid, p-hydroxybenzoic acid, 2,4-dihydroxybenzoic acid, gallic acid and hydroxyphthalic acid, and salts of these acids such as sodium, potassium and ammonium salts. The aliphatic compounds and their salts are preferred.

The oxocarboxylic acid compounds (C) are oxocarboxylic acids containing at least one aldehyde or keto group and at least one carboxyl group in the molecule. Specific examples include compounds preferably having 2 to 8 carbon atoms, such as glyoxylic acid, malonaldehydic acid, succinaldehydic acid, pyruvic acid, 2-ketobutyric acid, 4-acetylbutyric acid, 2-ketoglutaric acid, 4-keto-n-valeric acid, acetoacetic acid, oxomalonic acid, oxaloacetic acid and acetonedicarboxylic acid, and their salts such as sodium, potassium and ammonium salts.

These compounds (A), (B) and (C) may be used in combinations. Particularly, the use of the compound (A) in combination with the compound (B) and/or the compound (C) gives a synergistic improving effect as compared with the use of them singly. The mixing proportions of these in such a case may be selected as desired. Usually, 1 to 99 mole% of the compound (A) is used in combination with 99 to 1 mole% of the compound (B) and/or the compound (C). Preferably, 10 to 90 mole% of the compound (A) is used in combination with 90 to 10 mole% of the compounds (B) and/or the compound (C). More preferably, 20 to 80 mole% of the compound (A) is used together with 80 to 20 mole% of the compound (B) and/or the compound (C).

The amount of the stabilizer may be selected depending upon the properties required of the final composition. Usually, it is at least 0.5% by weight, preferably 0.5 to 20% by weight, and more preferably 1 to 10% by weight, based on the iron content of the ferrous compound. If the amount is excessively small, the stabilizing effect is insufficient. Excessively large amounts are economically disadvantageous.

The iron compound-containing composition may be in the form of an aqueous solution or a powder so long as it comprises the ferrous compound and the particular stabilizer described. The composition as an aqueous solution can be obtained by mixing an aqueous solution containing the ferrous compound with a water-soluble stabilizer selected from the above-specified stabilizer compounds. The powdery composition may be obtained by drying the aforesaid aqueous solution in a customary manner. For example, the aqueous solution is spray-dried, or under reduced pressure, at a temperature of not more than 150° C., preferably not more than 100° C. Alternatively, it may be obtained by mechanically mixing the ferrous compound in the form of a crystal powder with a powdery stabilizer of the specified group or a solution or dispersion of the stabilizer in water or a solvent. Desirably, the mixing temperature in this method is adjusted to not more than 150° C., preferably not more than 100° C. If the mixing temperature is excessively high, the stabilizer may undergo decomposition, or water of crystallization may be liberated from the ferrous compound. Such troubles will reduce the productivity.

The present invention can increase the stability of ferrous compounds as compared with known techniques using ascorbic acid. Powders or aqueous solutions of ferrous compounds so stabilized, either as such or impregnated in various carriers, can be widely used as raw materials for deodorants, water treating agents, mordants, medicines, pigments, mold proofing agents, bactericides, oxygen absorbing agents, etc.

The following examples illustrate the present invention more specifically.

It is seen from the results given in Table 1 that when no stabilizer was used (Run No. 1-1), a precipitate formed within a short period of time, and the stability of the iron compound was inferior, whereas when erythorbic acid was added, the iron compound remained stable over a long period of time.

TABLE 1

| Run No. | Erythorbic acid Concentration (g/l) | Proportion based on Fe (%) | 1st day | 2nd day | 3rd day | 4th day | 5th day | 6th day | 7th day | 8th day | 9th day | 10th day |
|---|---|---|---|---|---|---|---|---|---|---|---|---|
| | | | | | | Control | | | | | | |
| 1-1 | 0 | 0 | Yellowish green Turbid | Precipitated | | | | | | | | |
| | | | | | | | Invention | | | | | |
| 1-2 | 1 | 2 | Pale blue | → | → | → | Green | → | → | → | → | → |
| | | | Transparent | → | → | → | → | → | → | → | → | → |
| 1-3 | 1.5 | 3 | Pale blue | → | → | → | → | → | → | → | → | → |
| | | | Transparent | → | → | → | → | → | → | → | → | → |
| 1-4 | 3 | 6 | Pale blue | → | → | → | → | → | → | → | → | → |
| | | | Transparent | → | → | → | → | → | → | → | → | → |
| 1-5 | 5 | 10 | Pale blue | → | → | → | → | → | → | → | → | → |
| | | | Transparent | → | → | → | → | → | → | → | → | → |

| Run No. | Erythorbic acid Concentration (g/l) | Proportion based on Fe (%) | 11th day | 12th day | 13th day | 14th day | 15th day | 16th day | 17th day | 18th day | 19th day | 20th day | 21st day |
|---|---|---|---|---|---|---|---|---|---|---|---|---|---|
| | | | | | | | Control | | | | | | |
| 1-1 | 0 | 0 | | | | | | | | | | | |
| | | | | | | | | Invention | | | | | |
| 1-2 | 1 | 2 | → | → | → | → | → | → | → | Yellowish green | → | → | Precipitated |
| | | | → | → | → | → | → | → | → | → | → | Turbid | |
| 1-3 | 1.5 | 3 | → | Green | → | → | → | → | → | Yellowish green | → | → | Blackish yellow |
| | | | → | → | → | → | → | → | → | → | → | → | → |
| 1-4 | 3 | 6 | → | Green | → | → | → | → | → | Yellowish green | → | → | Blackish yellow |
| | | | → | → | → | → | → | → | → | → | → | → | → |
| 1-5 | 5 | 10 | → | Green | → | → | → | → | → | Yellowish green | → | → | Blackish yellow |
| | | | → | → | → | → | → | → | → | → | → | → | → |

(*) The upper rows indicate the changes in the colors of the aqueous solutions, and the lower rows, the changes in the transparency of the aqueous solution. The indication "precipitated" means that a precipitate formed and further observation was stopped.

EXAMPLE 1

In each run, a predetermined amount of erythorbic acid was dissolved in an aqueous solution of ferrous sulfate having an iron concentration of 50 g/liter. One hundred milliliters of the aqueous solution was put in a 100 ml. beaker, and a glass plate was placed on the beaker. The beaker was left to stand, and the color of the aqueous solution and the time of formation of a precipitate were observed. The results are shown in Table 1.

EXAMPLE 2

Run No. 1-4 of Example 1 was repeated except that sodium erythorbate was used instead of erythorbic acid. The results obtained were substantially the same as those obtained in Run No. 1-4 of Example 1.

EXAMPLE 3

In each run, a predetermined amount of each of the hydroxycarboxylic acids indicated in Table 2 was used instead of erythorbic acid. The results are shown in Table 2.

The results shown in Table 2 demonstrate that the iron compound was stable over a long period of time also when the hydroxycarboxylic acids were incorporated.

TABLE 2

| Run No. | Sample Stabilizer | Concentration (g/l) | 1st day | 2nd day | 3rd day | 4th day | 5th day | 6th day | 7th day | 8th day | 9th day |
|---|---|---|---|---|---|---|---|---|---|---|---|
| | | | | | Control | | | | | | |
| 3-1 | None | 0 | Yellowish green Turbid | Precipitated | | | | | | | |
| | | | | | Invention | | | | | | |
| 3-2 | Tartaric acid | 1 | Yellowish green Transparent | → → | → → | → → | → → | → → | Yellow → | → → | → → |
| 3-3 | | 2 | Yellowish green Transparent | → → | → → | → → | → → | → → | → → | → → | → → |
| 3-4 | | 3 | Yellowish green Transparent | → → | → → | → → | → → | → → | → → | → → | → → |
| 3-5 | Gluconic acid | 1 | Yellowish green Transparent | → → | → → | → → | → → | → → | Yellow → | → → | → → |
| 3-6 | | 2 | Yellowish green Transparent | → → | → → | → → | → → | → → | → → | → → | → → |
| 3-7 | | 3 | Yellowish green Transparent | → → | → → | → → | → → | → → | → → | → → | → → |
| 3-8 | Citric acid | 1 | Yellowish green Transparent | → → | → → | → → | → → | → → | → → | → → | → → |
| 3-9 | | 2 | Yellowish green Transparent | → → | → → | → → | → → | → → | → → | → → | → → |
| 3-10 | Maleic acid | 1 | Green Transparent | → → | → → | → → | Yellowish green → | → → | Yellow → | → → | Blackish yellow → |
| 3-11 | | 2 | Green Transparent | → → | → → | → → | Yellowish green → | → → | Yellow → | → → | → → |

| Run No. | Sample Stabilizer | Concentration (g/l) | 10th day | 11th day | 12th day | 13th day | 14th day | 15th day | 16th day | 20th day | 21st day |
|---|---|---|---|---|---|---|---|---|---|---|---|
| | | | | | Control | | | | | | |
| 3-1 | None | 0 | | | | | | | | | |
| | | | | | Invention | | | | | | |
| 3-2 | Tartaric acid | 1 | → → | → → | → → | → → | → → | Orange → | → → | → → | → → |
| 3-3 | | 2 | → → | → → | → → | → → | → → | → → | → → | → → | Yellow → |
| 3-4 | | 3 | → → | → → | → → | → → | → → | → → | → → | → → | Yellow → |
| 3-5 | Gluconic acid | 1 | → → | → → | → → | → → | → → | Orange → | → → | → Turbid | → → |
| 3-6 | | 2 | → → | → → | → → | → → | Yellow → | → → | → → | → → | → → |
| 3-7 | | 3 | → → | → → | → → | → → | Yellow → | → → | → → | → → | → → |
| 3-8 | Citric acid | 1 | → → | → → | → → | → Turbid | Precipitated | | | | |
| 3-9 | | 2 | → → | → → | → → | → → | → → | → → | → → | → → | Blackish yellow → |
| 3-10 | Maleic acid | 1 | → → | → → | → → | → → | → Turbid | → → | Precipitated | | |

TABLE 2-continued

| 3-11 | 2 | Blackish yellow → → | → → | → → | → → | → → | → → | → → | → → |

(*) Same as the footnote to TABLE 1.

EXAMPLE 5

Example 1 was repeated except that each of the oxocarboxylic acids shown in Table 3 was used instead of erythorbic acid. The results are shown in Table 3.

The results shown in Table 3 demonstrate that when the oxocarboxylic acids were incorporated, the iron compound also remained stable over a long period of time.

TABLE 3

| Run No. | Sample Stabilizer | Concentration (g/l) | 1st day | 2nd day | 3rd day | 4th day | 5th day | 6th day | 7th day | 8th day | 9th day | 10th day |
|---|---|---|---|---|---|---|---|---|---|---|---|---|
| | | | | | | Control | | | | | | |
| 5-1 | None | 0 | Yellowish green Turbid | Precipitated | | | | | | | | |
| | | | | | | Invention | | | | | | |
| 5-2 | 2-ketoglutaric acid | 1 | Pale brown Transparent | → → | → → | → → | Blackish brown → | → → | → → | → → | → → | → → |
| 5-3 | | 2 | Pale brown Transparent | → → | → → | → → | Light brown → | → → | → → | → → | → → | → → |
| 5-4 | | 3 | Pale brown Transparent | → → | → → | → → | Light brown → | → → | → → | → → | → → | → → |
| 5-5 | Pyruvic acid | 1 | Pale yellow Transparent | → → | → → | → → | Blackish yellow → | → → | → → | → → | → → | → Turbid |
| 5-6 | | 2 | Pale brown Transparent | → → | → → | → → | Blackish yellow → | → → | → → | Brown → | → → | |
| 5-7 | | 3 | Pale brown Transparent | → → | → → | → → | Blackish yellow → | → → | → → | Brown → | → → | |
| 5-8 | Glyoxylic acid | 1 | Yellowish green Transparent | → → | → → | → → | → → | → → | → → | → → | Yellow → | → → |
| 5-9 | | 2 | Yellowish green Transparent | → → | → → | → → | → → | → → | → → | → → | Yellow → | → → |
| 5-10 | | 3 | Yellowish green Transparent | → → | → → | → → | → → | → → | → → | → → | Yellow → | → → |

| Run No. | Sample Stabilizer | Concentration (g/l) | 11th day | 12th day | 13th day | 14th day | 15th day | 16th day | 17th day | 18th day | 19th day | 20th day | 21st day |
|---|---|---|---|---|---|---|---|---|---|---|---|---|---|
| | | | | | | | Control | | | | | | |
| 5-1 | None | 0 | | | | | | | | | | | |
| | | | | | | | Invention | | | | | | |
| 5-2 | 2-ketoglutaric acid | 1 | → → | Precipitated | | | | | | | | | |
| 5-3 | | 2 | → → | → → | → → | Reddish brown → | → → | → Turbid | → → | → → | Precipitated | | |
| 5-4 | | 3 | → → | → → | → → | Reddish brown → | → → | → → | → → | → → | Precipitated | | |
| 5-5 | Pyruvic acid | 1 | → → | Precipitated | | | | | | | | | |
| 5-6 | | 2 | → → | → → | → → | → → | → → | → → | → → | → → | Light | → | → |

TABLE 3-continued

| 5-7 | | 3 | → | → | → | → | → | → | → | → | →<br>Light<br>brown | → | → |
| --- | --- | --- | --- | --- | --- | --- | --- | --- | --- | --- | --- | --- | --- |
| 5-8 | Gly-<br>oxylic<br>acid | 1 | →<br>→ | → | →<br>→ | → | → | → | → | → | →<br>Precipi-<br>tated | → | → |
| 5-9 | | 2 | →<br>→ | → | →<br>→ | → | → | → | → | Turbid<br>→ | → | → | → |
| 5-10 | | 3 | →<br>→ | → | →<br>→ | → | → | → | → | → | → | → | → |

(*) Same as the footnote to TABLE 1.

EXAMPLE 6

In each run, each of the stabilizers indicated in Table 4 was dissolved in a concentration of 1 g/liter in an aqueous solution of ferrous sulfate having an iron concentration of 50 g/liter. One hundred milliliters of the aqueous solution was put in a 100 ml beaker, and a glass plate was put over it. The beaker was left to stand for 20 days, and the color of the aqueous solution and the formation of a precipitate were observed.

TABLE 4

| | Amount of the stabilizer added (mole %) | | | | | | |
| --- | --- | --- | --- | --- | --- | --- | --- |
| Stabilizer | Control | | | Invention | | | |
| Erythorbic acid | 100 | 0 | 0 | 60 | 40 | 60 | 40 |
| Gluconic acid | 0 | 100 | 0 | 40 | 60 | 0 | 0 |
| Glyoxylic acid | 0 | 0 | 100 | 0 | 0 | 40 | 60 |
| State after 20-day standing | Precipitated | | | Yellowish green and transparent | | | |

It is seen from the above results that when erythorbic acid, gluconic acid and glyoxylic acid were used jointly, the stability of the iron compound was much better than when they were used singly.

EXAMPLE 7

Ferrous sulfate ($FeSO_4 \cdot 7H_2O$; 275 g) was dissolved in distilled water purged with nitrogen to prepare an aqueous solution (1000 ml). Five grams (9% based on Fe) of each of the stabilizers indicated in Table 5 was dissolved in the aqueous soution to prepare an aqueous solution containing ferrous sulfate and the stabilizer. The aqueous solution was spray-dried by a spray dryer (Model GA-31, made by Yamato Science Co., Ltd.) under the following conditions to form a powdery composition.

Amount of the aqueous solution passed: 35 ml/min.
Flow rate of drying air: 0.6 m³/min.
Inlet temperature: 120° C.

Ten grams of the powdery composition was taken into a glass Petri dish, and the dish was left to stand in a hot air oven at 80° C. Changes in the outer appearance of the composition with time were observed. Then, the composition was taken out and dissolved in water to prepare an aqueous solution. Changes in the appearance of the aqueous solution with time were also observed. The results are shown in Table 5.

For comparison, the same experiment as above was conducted without using any stabilizer or by using L-ascorbic acid as the stabilizer. The results are also shown in Table 5.

The results given in Table 5 demonstrate the higher stability of the iron compound stabilized by the stabilizer in accordance with this invention than that stabilized with L-ascorbic acid.

TABLE 5

| | | Changes in appearance with time | | Stability of the 40% aqueous solution (*) | |
| --- | --- | --- | --- | --- | --- |
| Run No. | Stabilizer | Immediately after pre-paration | After 1.5 hours | Immediately after pre-paration | After 1.5 hours |
| Invention | | | | | |
| 7-1 | Erythorbic acid | Pale brown | Brown | O | O |
| 7-2 | Tartaric acid | White | Pale yellowish white | O | O |
| 7-3 | Citric acid | Pale brown | Pale brown | O | O |
| 7-4 | Gluconic acid | Pale green | Pale yellowish green | O | O |
| 7-5 | Glyoxylic acid | Pale bluish white | Pale bluish white | O | O |
| Control | | | | | |
| 7-6 | None | Pale bluish white | Brown | X | X |
| 7-7 | L-ascorbic acid | Pale brown | Brown | O | X |

(*): Evaluated by O which shows that the solution was a uniform transparent solution, and X which shows that a precipitate formed.

EXAMPLE 8

In each run, each of the stabilizers indicated in Table 6 was added in an amount of 9% based on Fe to 275 g of crystals of ferrous sulfate, and the mixture was worked up by a mortar to form a white powdery composition.

Ten grams of the powdery composition was taken into a glass Petri dish. The Petri dish was left to stand at 20° C. for 10 days in a desiccator kept at a humidity of 79%, and changes in the outside appearance of the powdery composition were observed. After this test, the powdery composition was taken out and dissolved in water to form a 40% aqueous solution. Changes in the appearance of the aqueous solution were also observed. The results are shown in Table 6.

For comparison, the above experiment was repeated without using the stabilizer. The results are also shown in Table 6.

It is seen from Table 6 that the composition of this invention has better stability.

TABLE 6

| Run No. | Stabilizer | Changes in appearance with time | | Stability of the 40% aqueous solution (*) | |
|---|---|---|---|---|---|
| | | Immediately after preparation | After 1.5 hours | Immediately after preparation | After 10 days |
| Invention | | | | | |
| 8-1 | Erythorbic acid | Bluish white | Bluish white | O | O |
| 8-2 | Tartaric acid | Bluish white | Bluish white | O | O |
| 8-3 | 40% aqueous gluconic acid solution | Greenish white | Greenish white | O | O |
| 8-4 | 40% aqueous glyoxylic acid solution | Greenish white | Greenish white | O | O |
| Control | | | | | |
| 8-5 | None | Bluish white | Bluish white | X | X |

(*): Same as the footnote to TABLE 5.

EXAMPLE 9

Ten grams of each of the powdery compositions obtained in Runs Nos. 8-2 to 8-4 of Example 8 was taken into a glass Petri dish. The Petri dish was left to stand in a hot air oven at 80° C., and changes in the appearance of the powdery composition with time were observed. After the test, the powdery composition was taken out and dissolved in water to prepare a 40% aqueous solution. Then, changes in the appearance of the aqueous solution with time were observed. The results are shown in Table 7.

For comparison, the same test was repeated except that no stabilizer was used. The results are also shown in Table 7.

The results shown in Table 7 demonstrate the superiority of the composition of this invention.

TABLE 7

| Run No. | Stabilizer | Changes in appearance with time | | Stability of the 40% aqueous solution (*) | |
|---|---|---|---|---|---|
| | | Immediately after preparation | After 1.5 hours | Immediately after preparation | After 1.5 hours |
| Invention | | | | | |
| 9-1 | Tartaric acid | Bluish white | Greenish white | O | O |
| 9-2 | 40% aqueous gluconic acid solution | Greenish white | Greenish white | O | O |
| 9-3 | 40% aqueous glyoxylic acid solution | Greenish white | Greenish white | O | O |
| Control | | | | | |
| 9-4 | None | Bluish white | Light brown | X | X |

(°): Same as the footnote to TABLE 5.

What we claim is:

1. A composition consisting essentially of a ferrous compound selected from the group consisting of ferrous sulfate, ferrous chloride and ferrous nitrate and as a stabilizer, at least one compound selected from the group consisting of (A) erythorbic acid compounds, (B) hydroxycarboxylic acid compounds having 2 to 8 carbon atoms and (C) oxocarboxylic acid compounds having 2 to 8 carbon atoms and, optionally, water.

2. The composition of claim 1 which is in the form of an aqueous solution.

3. The composition of claim 1 which is in the form of a powder.

4. The composition of claim 3 which is obtained by drying the composition of claim 2.

5. The composition of claim 3 obtained by mixing a powder of the ferrous compound with the stabilizer compound.

6. The composition of claim 1 wherein the amount of the stabilizer compound is 0.5 to 20% by weight based on the iron content of the ferrous compound.

7. The composition of claim 1 wherein the hydroxycarboxyclic acid compounds are aliphatic compounds.

8. The composition of claim 1 wherein the oxocarboxylic acid compounds are aliphatic compounds.

9. The composition of claim 1 wherein the stabilizer compound is a mixture of the compound (A) with the compound (B) and/or the compound (C).

10. The composition of claim 1 wherein the stabilizer compound is a mixture of the compound (A) with the compound (B) or the compound (C) in a mole ratio of 20:80 to 80:20.

11. The composition of claim 1 wherein the stabilizer is the hydroxycarboxylic acid compound (B) and is selected from the group consisting of lactic acid, hydroxyacetic acid, hydroxybutyric acid, malic acid, tartaric acid, glyceric acid, citric acid, alpha-methylmalic acid, beta-hydroxglutaric acid, desoxalic acid, monoethyl tartrate, monoethyl citrate, gluconic acid, galactaric acid, glucronic acid, ketogluconic acid, salicylic acid, p-hydroxybenzoic acid, 2,4-dihydroxybenzoic acid, gallic acid, hydroxyphthalic acid and the salts thereof.

12. The composition of claim 1 wherein the stabilizer is the oxocarboxylic acid compound (C) and contains at least one aldehyde or keto group and at least one carboxyl group in the molecule.

13. The composition of claim 1 wherein the stabilizer is the hydroxycarboxylic acid compound (B) and contains at least one hydroxyl group and at least one carboxyl group in the molecule.

14. The composition of claim 1 wherein the stabilizer is the oxocarboxylic acid compound (C) and is selected from the group consisting of glyoxylic acid, malonaldehydic acid, succinaldehydic acid, pyruvic acid, 2-ketobutyric acid, 4-acetylbutyric acid, 2-ketoglutaric acid, 4-keto-n-valeric acid, acetoacetic acid, oxomalonic acid, oxaloacetic acid, acetonedicarboxylic acid and the salts thereof.

15. The composition of claim 1 wherein the stabilizer is the erythorbic acid compound (A) and is selected from the group consisting of erythorbic acid and the sodium and potassium salts thereof.

* * * * *

UNITED STATES PATENT AND TRADEMARK OFFICE
CERTIFICATE OF CORRECTION

PATENT NO. : 4,652,435
DATED : March 24, 1987
INVENTOR(S) : TADAO NATSUUME, ET AL.

It is certified that error appears in the above-identified patent and that said Letters Patent is hereby corrected as shown below:

On the face of the patent, under "[30] Foreign Application Priority Data", the first Japanese Application No. "59-283482" should read --59-263482--.

Signed and Sealed this
Tenth Day of May, 1988

Attest:

DONALD J. QUIGG

Attesting Officer

Commissioner of Patents and Trademarks